United States Patent Office 3,487,047
Patented Dec. 30, 1969

3,487,047
PROCESS FOR THE MANUFACTURE OF PHENOLIC ETHER RESINS CONTAINING AN N-ACYL-AMINO ACID
Hans Wissmann and Walter Siedel, Bad Soden, Taunus, and Rolf Geiger, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 18, 1968, Ser. No. 714,085
Claims priority, application Germany, Mar. 17, 1967, F 51,850
Int. Cl. C08g 5/18
U.S. Cl. 260—52    1 Claim

ABSTRACT OF THE DISCLOSURE

Manufacture of N-acylamino-acid-containing synthetic resins by reaction of an acylamino-acid-(thiophen-2)-methyl ester with a phenol ether/formaldehyde condensation product.

---

The present invention relates to a process for the manufacture of synthetic resins containing an N-acylamino-acid.

We have found that synthetic resins containing a N-acylamino-acid can be prepared by reacting on acylamino-acid-(thiophen-2)-methyl ester with a reactive condensation product of a phenol ether and formaldehyde.

Acylamino-acid esters of cross-linked hydroxymethyl-polystyrenes are known. They are prepared, according to J. Amer. Chem. Soc. 85 (1963), page 2149, by chloro-methylation of cross-linked polystyrene and reaction of the chloromethyl - polystyrene with triethyl - ammonium salts of acylamino-acids in boiling ethanol.

In the first reaction step of the known process, it is difficult to reach a determined content of chloromethyl groups. This reaction step must be carried out in heterogeneous phase and requires thus a large excess of chlorodimethyl ether as the chloromethylation reagent. In the next step, only a part of the chloromethyl groups reacts to yield the acylamino-acid ester. The remainder is unchanged or forms a quaternary ammonium compound with triethylamine.

In the process of the present invention, the chlorometh-ylation step is by-passed. The above-mentioned disadvantages of the known process are thereby avoided, since suitable N-acyl-amino-acid esters are incorporated by condensation as such directly into reactive condensation products of phenol ethers and formaldehyde.

Such reactive condensation products of phenol ethers and formaldehyde which are suitable for the process of the present invention can be prepared in known manner, for example according to the method described in Houben-Weyl "Methoden der Organischen Chemie," volume 14/2, pages 302–305 (1963). For example, alkyl ethers of mono- or poly-functional phenols are condensed with at least the molar quantity of formaldehyde in the presence of acid catalysts, for example boron-trifluoride etherate, trifluoroacetic acid or concentrated sulfuric acid, at temperatures of up to 100° C. and reaction periods of up to 20 hours. In this way, synthetic resins are obtained which are swellable and insoluble at room temperature in the usual organic solvents.

For preparing the acylamino-acid-(thiophen-2)-methyl esters, which have not been described as yet and which are used as starting substances, 2-chloromethyl-thiophen and alkali metal- or alkyl-ammonium salts of N-acyl-amino-acids, preferably lithium or triethyl-ammonium salts are reacted with one another in a solvent, for example dimethylformamide, dimethyl-acetamide, methylene chloride, chloroform or ethyl acetate or an alcohol, for example ethanol, at room temperature or at a slightly elevated temperature, generally not higher than 60° C.

As amino-acids, there may be used any of the amino-acids found in naturally occurring peptides in their L- or D-form, furthermore β- or ω-amino-acids or other only synthetically or semi-synthetically accessible amino-acids.

As acyl groups, there may be used the N-acyl-protective groups commonly used in peptide chemistry, for example the benzyloxycarbonyl, tert. butyloxycarbonyl or o-nitro-phenylsulfenyl group.

The condensation of the N-acylamino-acid-(thiophen-2)-methyl esters with the condensation product of a phenol ether and formaldehyde is effected at temperatures in the range of from 20 to 120° C., preferably at 80–100° C. For example, the finely pulverized condensation product of a phenol ether and formaldehyde is combined with the solution of a N-acylamino-acid-(thiopen-2)-methyl ester in an inert organic solvent. As solvent, there may be used lipophilic hydrocarbons, for example benzene or toluene, halogenated hydrocarbons for example methylene chloride, ether or carboxylic acid amides, for example, dimethyl formamide, or dimethylacetamide. After stirring at room temperature, the solvent is removed from the suspension by distillation and condensation is continued under reduced pressure, while raising the temperature to 100–120° C., over a drying agent, for example phosphorus pentoxide. The reaction period amounts to about 1–4 hours. The unreacted part of the N-acylamino-acid esters is then washed out with an organic solvent in which the N-acylamino-acid esters are soluble, for example ethanol, methylene chloride or dimethylformamide.

The new products obtained by the process of the present invention are valuable intermediate products for the solid phase peptide synthesis. Thus, for example, from the compounds of an acylamino-acid with synthetic resin, there may be prepared in a manner analogues to the methods described in Biochemistry, vol. 3 (1964), page 1385 and vol. 4 (1965), page 2394, and J. Amer. Chem. Soc. 88 (1966), page 5051, by acidolysis and stepwise peptide building up with acylamino-acids and dicyclohexylcarbo-diimide, or with activated acylamino-acid esters, the compounds of acyl-peptides with synthetic resin of biologically active peptides such as bradykinin, angiotensin and insulin, from which the respective peptide can be isolated by a short treatment with hydrogen bromide in trifluoroacetic acid.

The following examples illustrate the invention but they are not intended to limit it thereto; the abbreviations used for the protective groups are those commonly used in peptide chemistry and mean:

BOC=tert. butyloxycarbonyl
NPS=nitrophenyl-sulfenyl.

EXAMPLE I (a) BOC-glycine-[thiophen-(2)-methyl]-ester 0.1 mol of tert. butyloxycarbonyl-glycine was dissolved in 10 ml. of dimethylformamide at room temperature while stirring, and then, 0.1 mol of finely pulverized lithium hydroxide was introduced. When the latter had dissolved, 0.1 mol of 2-chloromethyl-thiophen was added dropwise. After having stirred the whole for 48 hours at room temperature, the suspension that had formed was filtered. The filtrate was evaporated under reduced pressure until it had an oily consistency. After the evaporation, the oil was suspended at 0° C, together with the solid body obtained, in 150 ml. of water, the pH was adjusted to 2.0 by means of 0.2 N-sulfuric acid and extracted with ethyl acetate. The ethyl acetate extract was washed with saturated sodium bicarbonate solution and with water, dried over magnesium sulfate and, after filtration, evaporated under reduced pressure. The oil thus obtained solidified in a refrigerator and was recrystallized from petrol ether. Melting point: 66–67° C. Yield: 45% of the theory.

(b) Condensation product of phenol ether and formaldehyde (pre-condensation product)

($b_1$).—0.5 ml. of trifluoroacetic acid and 12 ml. of a 30% aqueous formaldehyde solution were added to 13.8 g. of resorcinol-dimethyl ether. The whole was then heated for 18 hours, while stirring, on a steam bath. The reaction product which had separated in semi-solid form after cooling was triturated with 20 ml. of tetrahydrofurane and then with 3× 80 ml. of ether, each time with digestion and decanting; it was then filtered off with suction and dried under reduced pressure over phosphorus pentoxide. Yield: 8.5 g. of colorless powder.

($b_2$).—8 g. of para-formaldehyde and 1 ml. of borontrifluoride etherate were added to 28 ml. of resorcinol-dimethyl ether, while cooling with ice and stirring with a vibro-mixer. The whole was heated to 80° C., while continuing stirring with the vibro-mixer and maintained for 3 hours at this temperature. After further standing for 18 hours at room temperature, the product was worked up as described under ($b_1$). Yield: 30.6 g. of violet powder.

(c) Compound of BOC-glycine with synthetic resin ($c_1$).—5 g. of the condensation product described under ($b_1$) or ($b_2$) were kept for 48 hours at 80° C., while stirring, in a round flask having a capacity of 250 ml., in the solution of 2 g. of tert. butyloxy-carbonyl-glycine-(thiophen-2)-methyl ester in 20 ml. of dimethyl-formamide, during which time the content of the flask liquified. After completion of the reaction, the dimethylformamide was removed by distillation under reduced pressure. The remainder was digested with ethanol, whereupon the reaction product solidified in the form of a powder. The latter was thoroughly washed with each time 3 portions of 50 ml. ethanol, water and methanol and subsequently dried for 4 hours under reduced pressure at 100° C. over phosphorus pentoxide.

*Yield.*—2.5 g. of powdery compound of acylamino-acid with synthetic resin having a content of amino-acid of 0.045 millimol/g.

($c_2$).—2 g. of the finely pulverized condensation product described under ($b_2$) were intimately triturated with 0.8 g. of tert. butyloxycarbonyl-glycine - (thiophen-2)-methyl ester and then heated for 3½ hours, at 130° C., in a high vacuum, over phosphorus pentoxide. The product was then worked up as described above.

*Yield.*—1.1 g. Content of amino-acid: 0.084 millimol/g. of resin.

EXAMPLE 2

(a) BOC-L-leucine-[thiophen-(2)-methyl]-ester 0.1 mol of BOC-leucine-lithium salt was dissolved in 100 ml. of dimethylformamide at room temperature and then, 0.1 mol of 2-chloromethyl-thiophen was added. The whole was stirred for 65 hours at room temperature, then evaporation was carried out under reduced pressure and the product was worked up as described in Example 1(a). Yield: 19.3 g. of oil (60% of the theory).

*Analysis.*—Calcd.: N=4.28%; S=9.78% Found: N=4.3%; S=9.9%.

(b) Compound of BOC-L-leucine with synthetic resin 3 g. of the synthetic resin of the phenol ether and formaldehyde prepared according to Example 1($b_1$), were combined with the solution of 3.4 millimols of BOC-L-leucine-[thiophen-(2)-methyl]ester in 30 ml. of methylene chloride. After having stirred for 30 minutes at room temperature, the suspension was evaporated to dryness under reduced pressure in a rotatory evaporator. The whole was heated for 80 minutes to 120° C. under reduced pressure over phosphorus pentoxide. The residue was digested with 30 ml. of ethanol and the powdery product thus obtained was then stirred three times, each time for 3 minutes, with 50 ml. of ethanol, water and methanol, and filtered. After thorough drying under reduced pressure over phosphorus pentoxide, 2.41 g. of BOC-L-leucine-polymer compound having a leucine content of 0.064 millimol/g. were obtained.

EXAMPLE 3

(a) NPS-L-alanine-[thiophen-(2)-methyl]-ester 36.3 g. (0.15 mol) of NPS-alanine lithium salt were dissolved in 90 ml. of dimethylformamide at room temperature, combined with 19.8 g. (0.15 mol) of 2-chloromethyl-thiophen and stirred for 48 hours at room temperature. Then, 20.9 ml. (0.15 millimol) of triethylamine were added and the whole was further stirred for 48 hours. 1.5 liters of water were added and the whole was extracted with ethyl acetate. The ethyl acetate solution was washed with 1 N-sulfuric acid, saturated sodium bicarbonate solution and water, dried over anhydrous sodium sulfate and evaporated under reduced pressure. Yield: 20.5 g. of oil (40% of the theory).

The oily NPS-L-ala-thenyl ester could be converted into the crystalline hydrochloride of the L-alanine-α-thenyl ester by treatment with 3 N-ethereal hydrochloride acid.

(b) $H_2N$-L-alanine-[thiophen-(2)-methyl]-ester·HCl 3.4 g. (0.01 mol) of NPS-L-alanine-[thiophen(2)-methyl]-ester were shaken for 5 minutes with 30 ml. of a 3 N-solution of hydrogen chloride gas in absolute ether. The crystalline hydrochloride of L-alanine-α-thenyl ester thereupon precipitated. It was washed several times with absolute ether until the yellow color of the o-nitrophenyl-sulfenyl chloride formed during the reaction had disappeared. The product was filtered off with suction and dried under reduced pressure.

Yield of crude product: 1.4 g. (51% of the theory); melting point: 120° C. Melting point after recrystallization from a mixture of methylene chloride and ether: 125° C.; $[\alpha]_D^{21}$=—12.8°; (c=1, in ethanol).

*Analysis.*—Calcd.: N=6.3%; S=14.4%. Found: N=6.7%; S=13.5%. Paper chromatography: $R_f$=0.53, in butanol/acetic acid/water (70:7:2.5).

(c) Compound of NPS-L-alanine with synthetic resin

This compound was prepared in the manner described in Example 2(b), from NPS-L-alanine-[thiophen-(2)-methyl]-ester and the synthetic resin described in Example 1($b_1$). The compound of NPS-L-alanine with synthetic resin thus obtained had an alanine content of 0.22 millimol/g.

EXAMPLE 4

(a) NPS-L-leucine-[thiophen-(2)-methyl]-ester 22.5 g. of NPS-L-leucine were dissolved at room temperature in 80 ml. of dimethylformamide and combined with 11.2 ml. of triethylamine. Then, 10.6 g. of 2-chloromethyl-thiophen were added. The whole was shaken for 48 hours at room temperature. After evaporation under reduced pressure at a maximum temperature of +30° C., the product was worked up as described in Example 1(a). Yield: 28.5 g. of yellow oil (94% of the theory).

The product could be converted in a manner analogous to that described in Example 3(b) by treatment with absolute ethereal hydrochloric acid into the crystalline hydrochloride of L-leucine-α-thenyl ester, melting at 104–105° C., ($[\alpha]_D^{21}$=—6.32°; c.=1, in ethanol), with a yield of 81% of the theory.

*Analysis.*—Calcd.: N=5.32%; S=12.2%. Found: N=5.6%; S=11.5%.

(b) Compound of NPS-L-leucine with synthetic resin 4 g. of the synthetic resin prepared according to Example 1($b_2$) were stirred for 24 hours at 80° C. with a solution of 1.3 g. of NPS-L-leucine-thenyl ester in 10 ml. of dimethylformamide. The dimethylformamide was then evaporated at 80° C. under reduced pressure. The product was then heated for 2 hours at 125° C. in a high vacuum over phosphorus pentoxide. After cooling to room temperature, the whole was digested with ethanol until the product solidified in powdery form; the powder was washed thrice with each time 20 ml. of ethanol, water and methanol, each time with stirring for 3 minutes and following filtration, and dried under reduced pressure over phosphorus pentoxide. 3.5 g. of the compound of acylamino-acid with the synthetic resin having an aminoacid content of 0.22 millimol/g. were obtained.

We claim:
1. Process for the manufacture of an N-acylaminoacid-containing synthetic resin, wherein an acylaminoacid-(thiophen-2)-methyl ester is reacted with a reactive condensation product of a phenol ether and formaldehyde at temperatures in the range of from 20 to 120° C.

References Cited

UNITED STATES PATENTS

| | | | |
|---|---|---|---|
| 2,639,242 | 5/1953 | Suen | 117—155 |
| 2,717,263 | 9/1955 | McKinney et al. | 260—471 |
| 2,750,347 | 6/1956 | Bunnett | 260—2.2 |

WILLIAM H. SHORT, Primary Examiner

H. SCHAIN, Assistant Examiner

U.S. Cl. X.R.

260—51.5, 112.5, 332.2